D. H. ROSS.
CIRCUIT CONTROLLING SWITCH FOR HEADLIGHTS.
APPLICATION FILED JULY 3, 1919.
1,341,932.
Patented June 1, 1920.
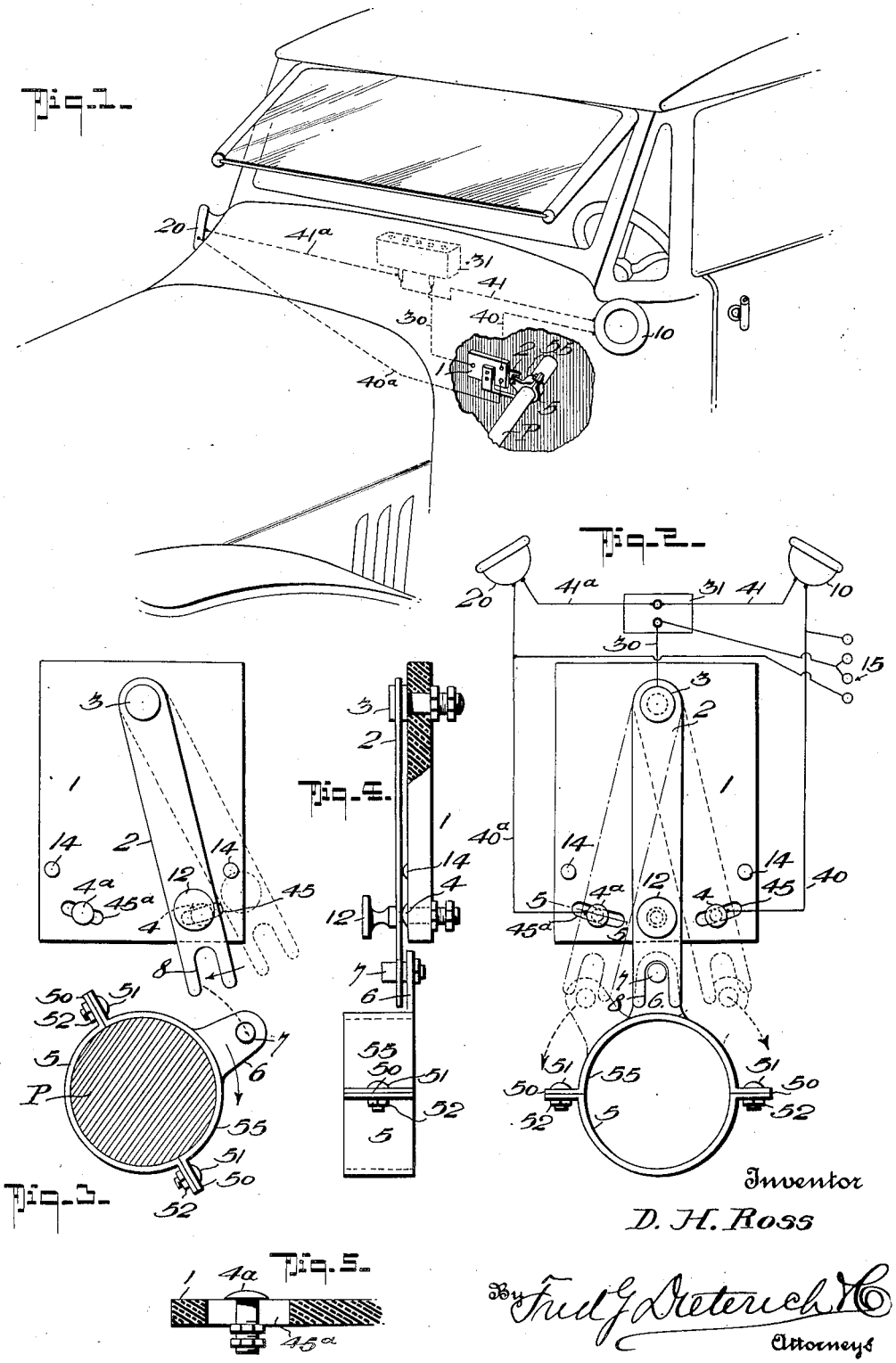

UNITED STATES PATENT OFFICE.

DAVID H. ROSS, OF LONG BEACH, CALIFORNIA.

CIRCUIT-CONTROLLING SWITCH FOR HEADLIGHTS.

1,341,932.  Specification of Letters Patent.  Patented June 1, 1920.

Application filed July 3, 1919. Serial No. 308,529.

*To all whom it may concern:*

Be it known that I, DAVID H. Ross, a citizen of the United States, residing at Long Beach, in the county of Los Angeles and State of California, have invented new and useful Improvements in Circuit-Controlling Switches for Headlights, of which the following is a specification.

This invention, which generally relates to automobile lamp signals, is particularly designed to provide an improved arrangement of lamp signals for automobiles for the special benefit of the driver to enable him to see the road, straight ahead, or at either side, while rounding a curve or turning a corner, at night.

A further object of my invention is to control, through the shifting of the steering post, while guiding the car to the left or to the right, the source of electrical energy for the signaling lights at each side of the vehicle so that the right hand lamp is lighted when the vehicle is steered to the right and the left hand lamp is likewise lighted, when turning toward the left.

Another and essential feature of my invention is to provide a circuit controlling switch mechanism for direction indicating or safety signals which may be readily applied to any of the ordinary standards of automobiles without requiring any change or rearrangement of the assembled parts of the vehicle and in which the electric circuit control or switch lever, after having been shifted to the desired position for closing the circuit to the left or right hand signal, automatically becomes disconnected from the steering post, as the latter continues in its steering direction and which is again picked up and connected with the steering post, as the latter returns to the midway or straight ahead position to cut out the side signals.

With other objects in view and hereinafter stated, my invention in its subordinate features, consists in the peculiar construction and combination of parts fully set out in the following detailed description, specifically stated in the appended claims and illustrated in the accompanying drawings, in which:

Figure 1 is a perspective view of my invention, so much of an automobile being shown necessary to indicate a practical application of my invention.

Fig. 2 is a diagrammatic plan view of my invention, the steering post controlled connection therewith, and the switch lever being shown in the midway or normal position in full lines and to the right and left hand, or circuit closing adjustments, in dotted lines.

Fig. 3 is a detail plan view of a portion of the circuit closing switch mechanism, the steering post being shown in section and shown at an extreme position to the right and out of engagement with the switch lever.

Fig. 4 is a side elevation and part section of the circuit control switch mechanism and the lever shifting collar that connects with the steering post.

Fig. 5 is a detail section of one of the adjustable contact screws and taken on the line 5—5 on Fig. 2.

In carrying out my invention, means are provided for operating in connection with the steering post of an automobile to selectively illuminate a lamp disposed at each side of the vehicle, the said lamps, at the opposite sides and located at the forward end of the said vehicle, being set at a predetermined fixed, or adjustable, angle to the course of the car, when in motion, it being understood that, when running the car straight ahead, the side direction indicating lamps are not lighted.

In the drawings, I have illustrated a convenient and preferable way of mounting the light control or switch mechanism for operating in connection with the steering post.

The switch operating mechanism in its detailed construction, which is best shown in Fig. 2, comprises a block 1 of fiber or other insulation material which is attached to the body of the car, adjacent to the steering post P, by any suitable bracket or other means.

A flat member, hereinafter termed the switch lever 2, is connected at its upper end to the block 1, near the top edge thereof, by a screw pivot 3, which latter constitutes a terminal for a circuit wire 30 leading from the source of light, which may be a battery 31, as shown.

4—4ª are two oppositely disposed round headed contact screws, one of which is mounted at each side of the block 1 and 40—40ª designate wire leads that connect with their respective right and left hand signal lamps 10 or 20 whose front faces are directed forwardly, but at an angle to the machine, so as to eject the light rays to the right or left according to which of the lamps is lighted, and the direction of the car, when leaving a straight ahead way and turning the corners, as the steering control determines.

41—41ª designate wire lead connections that join the lamps with the terminals of the battery, as shown.

5—55 designates a two part collar or band adapted for being readily mounted upon the steering post P, the two sections having coengaging ears 50 for receiving the clamp screws 51—51 that carry the clamping nuts 52—52.

The portion 55 of the collar has a forwardly extended bracket 6 which carries a stud 7 of fiber or other insulation material and which stud, under ordinary conditions, rides in the bifurcated or open ended slot 8 in the lower end of the switch lever 2, the connection of the parts being such that, when the car is run straight ahead and at the beginning of the turn of the steering wheel, either to the right or to the left, the stud 7 moves freely within the bifurcated end of the lever 2, as is clearly indicated on Fig. 2, by reference to which it will be noticed that, when the connections that join the switch lever with the post P are turned to the dotted position at the right, the switch lever is moved into engagement with the contact 4 at the right and thereby closes the circuit from the battery 31 through the right hand lamp, the opposite or left hand lamp being likewise energized, when the lever 2 is turned to the left hand dotted position and engages the contact member 4ª.

The contacts 4—4ª are preferably adjustably mounted in the slots 45—45ª in the block 1 to determine the amount of movement necessary to move the lever 2 into engagement with either of the contacts 4—4ª and the projection 6 on the collar member 55 may also be adjusted along the steering post T, as desired.

12 designates a finger knob or handle on the switch lever 2 for swinging the said lever 2 in either direction onto buttons 14 at the opposite sides of the block 1, the resiliency of the lever 2 being sufficient to hold it in frictional contact with either of the buttons 14—14 onto which it may be shifted.

It will be noticed by again referring to Fig. 2, the positions of the buttons 14—14 with respect to the pivot 3 of the lever 2 and the stud 7 on the collar member 6, are such, that, when the switch lever is swung laterally by gripping the finger knob 12, the forked end of the lever is held from being engaged by the stud 7, as the steering wheel is rotated in either direction, thereby holding the automatic switch control for the side lamps out of action, when the side lamps are not required, as in the day time.

From the foregoing description taken in connection with the accompanying drawings, the complete construction, the manner in which my light control devices are operable and the advantages thereof will be readily apparent.

By connecting the switch 2 with the steering post in the manner shown and described, it is manifest that, when my switch devices are set for use, that as soon as the steering post begins to turn (under its wheel control) in either direction, left or right, the lever 2 will be brought into engagement with the contact at the right or left side and be held from being further turned by reason of the stud 7 (after the lever 2 has been set onto its corresponding contact 4 or 4ª) leaving the slotted or forked end of the lever 2, the latter being now held to its shifted position by reason of its resiliency and frictional engagement with one of the contacts 4 or 4ª.

It will also be clear that, when the stud 7 leaves the forked end of the switch lever, the steering post may be continued in its turning movement, in either direction, without affecting the set position of the lever 2, it being also apparent that, when the driver wishes to return to the straight ahead running of the car that as he turns the steering post P back to the midway or normal position, the stud 7, in traveling back, reëngages with the forked end of the lever 2 and carries the said lever 2 back with it to the midway position and thereby cuts out the side light.

15 designates a push button switch for operating either of the side lamps independent of the automatic control devices, as when the car is running straight ahead or, if necessary to light the opposite lamp to that which the automatic switch operates and when rounding a curve.

What I claim is:

1. In direction indicators for motor vehicles wherein is provided a pair of headlights and a steering rod; a circuit closure comprising a base member adapted to be located adjacent to the steering post, a pair of oppositely disposed contacts on the base member adapted to be connected in circuit with the respective headlights, a resilient switch lever pivotally secured to the base plate and adapted to be swung laterally for engagement with either of said contacts, the swinging end of said lever being forked, and a member adapted to be attached to and projected radially from the steering rod, said member including a stud projectable through the forked end of the resilient switch lever.

2. In direction indicators for motor vehicles wherein is provided a pair of headlights and a steering rod; a circuit closure comprising a base member adapted to be located adjacent to the steering post, a pair of oppositely disposed contacts on the base member adapted to be connected in circuit with the respective headlights, a resilient switch lever pivotally secured to the base plate and adapted to be swung laterally for engagement with either of said contacts, the swinging end of said lever being forked and a member adapted to be attached to and projected radially from the steering rod, said member including a stud projectable through the forked end of the resilient switch lever, said base plate having a pair of oppositely disposed segmental slots for receiving said contacts, said oppositely disposed contacts being adjustably mounted in said slots and each including a head adapted to be engaged by the switch lever.

3. A controlling switch of the character described comprising a base member, a pair of oppositely disposed contacts on the base member, a resilient switch lever pivotally secured to the base member and adapted to be swung laterally to engage with either of said contacts, the free end of said lever being forked, a rotatable rod, a collar clamped on said rod and including a radially projecting arm having a stud adapted to project into the forked end of said resilient switch lever, and a pair of supplemental pivotally disposed contacts adapted to be engaged by the switch lever for holding said lever out of engagement with the first mentioned pair of contacts and from being engaged by the said actuating stud at times.

DAVID H. ROSS.